United States Patent
Schneider

(10) Patent No.: US 6,687,726 B1
(45) Date of Patent: Feb. 3, 2004

(54) APPARATUS FOR MULTIPLICATION BY CONSTANT FACTORS FOR VIDEO COMPRESSION METHOD (MPEG)

(75) Inventor: Claus Schneider, München (DE)

(73) Assignee: Infineon Technologies AG, Munich (DE)

( * ) Notice: Subject to any disclaimer, the term of this patent is extended or adjusted under 35 U.S.C. 154(b) by 457 days.

(21) Appl. No.: 09/596,891

(22) Filed: Jun. 19, 2000

Related U.S. Application Data

(63) Continuation of application No. PCT/DE98/03118, filed on Oct. 22, 1998.

(30) Foreign Application Priority Data

Dec. 19, 1997 (DE) ............................................ 197 56 827

(51) Int. Cl.[7] ................................................ G06F 7/50
(52) U.S. Cl. ................................................ 708/625
(58) Field of Search ................................ 708/625, 620

(56) References Cited

U.S. PATENT DOCUMENTS

| | | | | |
|---|---|---|---|---|
| 4,031,377 A | * | 6/1977 | Deutsch et al. ............. | 708/625 |
| 4,475,167 A | * | 10/1984 | Chen ......................... | 708/625 |
| 4,823,300 A | | 4/1989 | Malinowski ................ | 364/757 |
| 4,887,232 A | | 12/1989 | Wolrich et al. ............. | 364/754 |
| 5,402,369 A | * | 3/1995 | Main ......................... | 708/625 |

FOREIGN PATENT DOCUMENTS

| | | |
|---|---|---|
| DE | 196 18 117 C1 | 10/1997 |
| GB | 2 308 937 A | 7/1997 |

OTHER PUBLICATIONS

Japanese Patent Abstract No. 57041738 (Shigenori), dated Mar. 9, 1982.

"Multiplication by Integer Constants" (Wiley & Sons), dated Jul. 1986, Software Practice & Experience, vol. 16, No. 7, pp. 641–652.

"Parallel–Serial Multiplication Using Booth's Algorithm And Horner's Scheme" (Stölzle et al.), dated 1985, Siemens, AG, Central Resench Development, pp. 1389–1390, as mentioned on p. 1 of the specification.

* cited by examiner

*Primary Examiner*—David H. Malzahn
(74) *Attorney, Agent, or Firm*—Laurence A. Greenberg; Werner H. Stemer; Gregory L. Mayback

(57) ABSTRACT

Particularly with relatively complex multiplication devices with a downstream shift device, such as those which occur in video compression devices, the apparatus is used to save chip area and to increase the processing speed. The multiplier is split into a factor element and a shift element, and the shift element is also taken into account in the downstream shift unit.

6 Claims, 1 Drawing Sheet

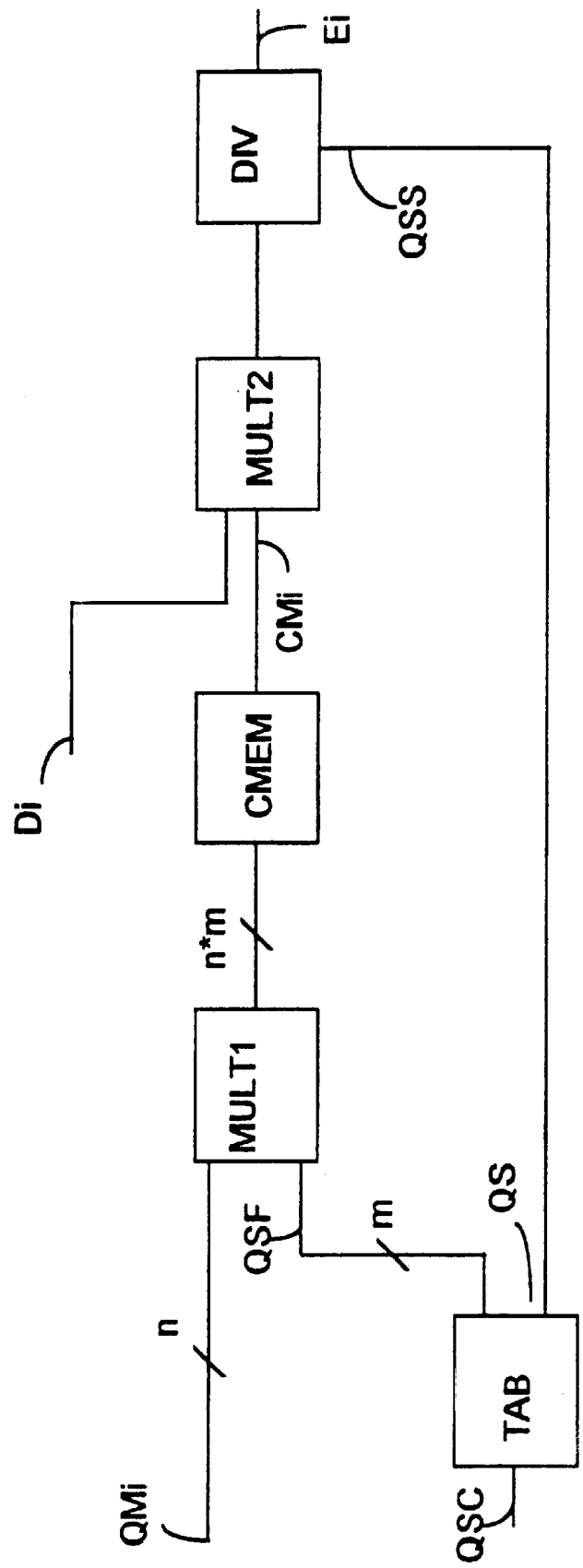

APPARATUS FOR MULTIPLICATION BY CONSTANT FACTORS FOR VIDEO COMPRESSION METHOD (MPEG)

CROSS-REFERENCE TO RELATED APPLICATION

This is a continuation of international application PCT/DE98/03118, filed Oct. 22, 1998, which designated the United States.

BACKGROUND OF THE INVENTION

1. Field of the Invention

The invention lies in the electronics field. More specifically, the invention relates to an apparatus for multiplication by a constant coefficient, in which, for example, the multiplier is processed in the form of a shift number and further information.

Such an apparatus is known from the Proceedings of the IEEE Conference ISCAS 85, p. 1389–90. The document explains that, for multiplication by constant coefficients, it is advantageous to store the multiplier in CSD code in such a way that the control unit reads the shift number and the sign directly from a coefficient memory without recoding.

2. Summary of the Invention

It is accordingly an object of the invention to provide an apparatus for multiplying with constant factors and a video compression method (MPEG), which overcomes the above-mentioned disadvantages of the heretofore-known devices and methods of this general type and in which the required circuit area is as small as possible, and the processing speed is as high as possible.

With the foregoing and other objects in view there is provided, in accordance with the invention, an apparatus for multiplication by constant factors, comprising:

a table outputting, in dependence on a code, a factor element and a shift element of a multiplier;

a bit-reduced multiplication device having an input receiving the factor element and an output;

a shift device having an input connected to the output of the bit-reduced multiplication device and having a control signal input;

the shift device receiving the shift element as a control signal with the number of shift steps; and the shift device outputting a final result of a multiplication with a respective constant factor.

In accordance with an added feature of the invention, the table is configured such that the shift device is designed for a single shift direction.

In accordance with an additional feature of the invention, the table is configured such that the shift element is constant and/or the factor element corresponds substantially to the code for the multiplier.

In accordance with another feature of the invention, the table is configured such that as many factor elements as possible are of equal magnitude.

With the above and other objects in view there is also provided, in accordance with the invention, a video compression method performed with the above-outlined apparatus, which comprises:

inputting a code of an input variable quantization scale, wherein the multiplier corresponds to a scaling factor defined by the quantization scale;

forming the bit-reduced multiplication device as a series circuit formed of a first multiplier, a cache member, and a second multiplier, and supplying a first input of the first multiplier with a factor element of the scaling factor, supplying a second input of the first multiplier with values from a quantization matrix, and further supplying the second multiplier with input data; and carrying out division by a power of the number 2 with the shift device in dependence on the shift element of the scaling factor.

Other features which are considered as characteristic for the invention are set forth in the appended claims.

Although the invention is illustrated and described herein as embodied in an apparatus for multiplying with constant factors and a video compression method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a schematic block diagram of an exemplary embodiment of the invention.

DESCRIPTION OF THE PREFERRED EMBODIMENT

Referring now to the sole figure of the drawing in detail, a multiplicand QMi with a word width of n and a factor element QSF with a word width of m of a multiplier QS are supplied to a bit-reduced multiplication device whose components are MULT1, CMEM and MULT2, and downstream from which there is a shift device DIV. The shift device DIV is also supplied with a shift element QSS of the multiplier QS, and provides the multiplication result Ei. The factor element QSF and the shift element QSS are assigned in a table TAB to a code QSC. This may be done, for example, by storing the values QSF and QSS and addressing by means of the code QSC, or else by means of appropriate logic or wiring.

By representing the multiplier QS in the form of a factor element and a shift element, all the components of the bit-reduced multiplication unit can be designed for a shorter word width, which leads to a considerable amount of surface area being saved particularly when the bit-reduced multiplication device contains a large number of components and/or when a shift device for multiplication or division by powers of the number 2 is present anyway. Division is in this case particularly advantageous since the shift element means a shift in the opposite direction, and it may be possible to design the shift device to be smaller.

In order that the table TAB itself occupies a particularly small chip area, it is advantageous to derive the factor element QSF in as simple a manner as possible from the code QSC, and to choose the shift element QSS to be as constant as possible.

Table 1, below, shows an example of a linear relationship TYP0 between the code QSC and the multiplier QS, and an example of a non-linear relationship TYP1 between the code QSC and the multiplier QS. It is evident from this that, with the linear relationship TYP0, the factor element QSF corresponds to the code QSC in an ideal manner and the shift element QSS is constant, for example equal to 1 in this case, for all multiplier values. In the case of the non-linear relationship TYP1, QSF and QSC are identical up to the number 8, and only three different values are required for QSS.

TABLE 1

| QSC | Type0 | | | Type1 | | |
|---|---|---|---|---|---|---|
| | QS | QSF | QSS | QS | QSF | QSS |
| 0 | | | | forbidden | | |
| 1 | 2 | 1 | 1 | 1 | 1 | 0 |
| 2 | 4 | 2 | 1 | 2 | 2 | 0 |
| 3 | 6 | 3 | 1 | 3 | 3 | 0 |
| 4 | 8 | 4 | 1 | 4 | 4 | 0 |
| 5 | 10 | 5 | 1 | 5 | 5 | 0 |
| 6 | 12 | 6 | 1 | 6 | 6 | 0 |
| 7 | 14 | 7 | 1 | 7 | 7 | 0 |
| 8 | 16 | 8 | 1 | 8 | 8 | 0 |
| 9 | 18 | 9 | 1 | 10 | 10 | 0 |
| 10 | 20 | 10 | 1 | 12 | 12 | 0 |
| 11 | 22 | 11 | 1 | 14 | 14 | 0 |
| 12 | 24 | 12 | 1 | 16 | 16 | 0 |
| 13 | 26 | 13 | 1 | 18 | 18 | 0 |
| 14 | 28 | 14 | 1 | 20 | 20 | 0 |
| 15 | 30 | 15 | 1 | 22 | 22 | 0 |
| 16 | 32 | 16 | 1 | 24 | 24 | 0 |
| 17 | 34 | 17 | 1 | 28 | 28 | 0 |
| 18 | 36 | 18 | 1 | 32 | 16 | 1 |
| 19 | 38 | 19 | 1 | 36 | 18 | 1 |
| 20 | 40 | 20 | 1 | 40 | 20 | 1 |
| 21 | 42 | 21 | 1 | 44 | 22 | 1 |
| 22 | 44 | 22 | 1 | 48 | 24 | 1 |
| 23 | 46 | 23 | 1 | 52 | 26 | 1 |
| 24 | 48 | 24 | 1 | 56 | 28 | 1 |
| 25 | 50 | 25 | 1 | 64 | 16 | 2 |
| 26 | 52 | 26 | 1 | 72 | 18 | 2 |
| 27 | 54 | 27 | 1 | 80 | 20 | 2 |
| 28 | 56 | 28 | 1 | 88 | 22 | 2 |
| 29 | 58 | 29 | 1 | 96 | 24 | 2 |
| 30 | 60 | 30 | 1 | 104 | 26 | 2 |
| 31 | 62 | 31 | 1 | 112 | 28 | 2 |

As an alternative to this, the Table TAB, such as the following Table 2, can be designed such that the factor elements are the same for as many multipliers as possible. This has the advantage that the processing speed is increased, since recalculation in the bit-reduced multiplication device is required only when the factor element of the multiplier changes. Once again, by way of example, Table 2 is a table for a linear relationship Type 0 between the code QSC and the multiplier QS, and for a non-linear relationship TIP1 between the code QSC and the multiplier QS.

TABLE 1

| QSC | Type0 | | | Type1 | | |
|---|---|---|---|---|---|---|
| | QS | QSF | QSS | QS | QSF | QSS |
| 0 | | | | forbidden | | |
| 1 | 2 | 1 | 1 | 1 | 1 | 0 |
| 2 | 4 | 1 | 2 | 2 | 1 | 1 |
| 3 | 6 | 3 | 1 | 3 | 3 | 0 |
| 4 | 8 | 1 | 3 | 4 | 1 | 2 |
| 5 | 10 | 5 | 1 | 5 | 5 | 0 |
| 6 | 12 | 3 | 2 | 6 | 3 | 1 |
| 7 | 14 | 7 | 1 | 7 | 7 | 0 |
| 8 | 16 | 1 | 4 | 8 | 1 | 3 |
| 9 | 18 | 9 | 1 | 10 | 5 | 1 |
| 10 | 20 | 5 | 2 | 12 | 3 | 2 |
| 11 | 22 | 11 | 1 | 14 | 7 | 1 |
| 12 | 24 | 3 | 3 | 16 | 1 | 4 |
| 13 | 26 | 13 | 1 | 18 | 9 | 1 |
| 14 | 28 | 7 | 2 | 20 | 5 | 2 |
| 15 | 30 | 15 | 1 | 22 | 11 | 1 |
| 16 | 32 | 1 | 5 | 24 | 3 | 3 |

TABLE 1-continued

| QSC | Type0 | | | Type1 | | |
|---|---|---|---|---|---|---|
| | QS | QSF | QSS | QS | QSF | QSS |
| 17 | 34 | 17 | 1 | 28 | 7 | 2 |
| 18 | 36 | 9 | 2 | 32 | 2 | 4 |
| 19 | 38 | 19 | 1 | 36 | 9 | 2 |
| 20 | 40 | 5 | 3 | 40 | 5 | 3 |
| 21 | 42 | 21 | 1 | 44 | 11 | 2 |
| 22 | 44 | 11 | 2 | 48 | 3 | 4 |
| 23 | 46 | 23 | 1 | 52 | 13 | 2 |
| 24 | 48 | 3 | 4 | 56 | 7 | 3 |
| 25 | 50 | 25 | 1 | 64 | 4 | 4 |
| 26 | 52 | 13 | 2 | 72 | 9 | 3 |
| 27 | 54 | 27 | 1 | 80 | 5 | 4 |
| 28 | 56 | 7 | 3 | 88 | 11 | 3 |
| 29 | 58 | 29 | 1 | 96 | 6 | 4 |
| 30 | 60 | 15 | 2 | 104 | 13 | 3 |
| 31 | 62 | 31 | 1 | 112 | 7 | 4 |

The invention can advantageously be used in apparatuses for carrying out video compression methods more quickly, such as MPEG, and, in that case, can advantageously be used, for example, for inverse quantization.

In such inverse quantization, the elements $Q_{mi}$ in a quantization matrix QM, with a word width of, say, 8 bits, must be multiplied by constant factors QS, for example with a word width of 7 bits. An 8×7 bit multiplier would be required using conventional technology to do this, which provides a result with a width of 15 bits, which is buffer-stored in a cache memory CMEM, which likewise has to have a width of 15 bits. The output values $CM_i$ of the cache memory CMEM would then be multiplied by input data $D_i$ with a word with of 13 bits, giving a result with a word width of 28 bits.

For inverse quantization, it is now possible according to the invention, for example according to Table 1, to specify the factor element QSF by 5 bits and the shift element QSS by 2 bits, as a result of which all that is necessary is to carry out a multiplication with a word width of 8×5=13 bits, and the cache memory CMEM likewise need have only this reduced word width. Since, for example, the result still has to be divided by the number 16 for the MPEG1 Standard and by the number 32 for the MPEG2 Standard, corresponding to a shift to the right of 4 to 5 bits in the unit DIV, the shift values can be calculated with one another without any significant additional complexity, and only the resultant shift need be carried out.

I claim:

1. An apparatus for multiplication by constant factors, comprising:

(a) a table having an input for inputting a code of an input variable quantization scale, a first output for outputting, a factor element of a multiplier and a second output for outputting a shift element of said multiplier;

(b) a bit-reduced multiplication device having a first input for receiving the factor element, a second input for receiving a multiplicand, and an output for outputting a multiplication result; and (c) a shift device having an input connected to said output of said bit-reduced multiplication device and having a control signal input;

said shift device receiving the shift element as a control signal with the number of shift steps from the second output of said table via said control signal input; and said shift device outputting a final multiplication result of a multiplication of the multiplicand with a the respective multiplier.

2. The apparatus according to claim 1, wherein said table is configured such that said shift device is designed for a single shift direction.

3. The apparatus according to claim 2, wherein said table is configured such that the shift element is constant and/or the factor element corresponds substantially to the code for the multiplier.

4. The apparatus according to claim 1, wherein said table is configured such that as many factor elements as possible are of equal magnitude.

5. The apparatus according to claim 1, wherein the multiplicand is a value from a quantization matrix.

6. A video data compression method comprising the following steps:

(a) inputting a code of an input variable quantization scale;

(b) outputting a factor element and a shift element of a scaling factor which are assigned to the code in a table;

(c) multiplying the factor element of the scaling factor with a multiplicand from a quantization matrix; and (d) carrying out a division by a power of two with a shift device in dependence of the shift element of the scaling factor.

* * * * *